United States Patent [19]

Ohshima et al.

[11] Patent Number: 5,525,721

[45] Date of Patent: Jun. 11, 1996

[54] ACETYLATION METHOD FOR MATERIAL CONTAINING CELLULOSE, AND MANUFACTURING METHOD FOR MODIFIED WOOD

[75] Inventors: Yoshinobu Ohshima, Chiba; Yoshihiro Hirano, Hamamatsu; Akira Yamamoto, Nagoya, all of Japan

[73] Assignee: Yamaha Corporation, Japan

[21] Appl. No.: 264,432

[22] Filed: Jun. 23, 1994

[30] Foreign Application Priority Data

Jun. 25, 1993 [JP] Japan .................. 5-155364

[51] Int. Cl.$^6$ .................................................. C08B 3/06
[52] U.S. Cl. ........................................................ 536/69
[58] Field of Search ............................................. 536/69

[56] References Cited

U.S. PATENT DOCUMENTS

| | | | |
|---|---|---|---|
| 2,417,995 | 3/1947 | Stamm et al. | 117/118 |
| 2,780,511 | 2/1957 | Takagi | 8/121 |
| 3,094,431 | 6/1963 | Goldstein et al. | 117/59 |
| 3,403,145 | 9/1968 | Edge et al. | 8/120 |
| 3,720,661 | 3/1973 | Breton et al. | 8/121 |
| 3,894,839 | 7/1975 | Marmer et al. | 8/121 |
| 5,431,868 | 7/1995 | Hirano | 264/83 |

*Primary Examiner*—Jeffrey Mullis
*Attorney, Agent, or Firm*—Ostolenk, Faber, Gerb & Soffen

[57] ABSTRACT

A acetylating agent vapor is brought into contact with a material containing cellulose while continuously moving the acetylating agent, and thereby, the material containing cellulose is acetylated in a vapor phase. Solvents for dilution, catalysts, and an immersion process in an acetylating agent (liquid) are not necessary, and thereby, it is not merely the case that the process is simplified, but the acetylation period is shortened as a result of the increase in reaction efficiency, and the accumulation of excess heat of reaction in the material containing cellulose during the reaction is prevented, and thereby, the uniformity of acetylation is improved. Furthermore, in the present invention, wooden strips acetylated by this method are accumulated and modified wood is manufactured. This modified wood has superior resistance to moisture, possesses no acetic acid odor, and does not cause rusting.

13 Claims, 2 Drawing Sheets

ACETYLATION METHOD FOR MATERIAL CONTAINING CELLULOSE, AND MANUFACTURING METHOD FOR MODIFIED WOOD

FIELD OF THE INVENTION

The present invention relates to an acetylation method for material containing cellulose (and cellulose components) such as wood strips or the like, as well as to a manufacturing method for modified wood employing this, and more specifically, relates to a method for vapor phase acetylation of material containing cellulose, and to a manufacturing method for modified wood in which material containing cellulose acetylated in vapor phase are accumulated, molded so as to be unitary, and thereby, a wooden material having little hygroscopicity, and superior moisture resistance, is obtained. A term "cellulosic material" can be used interchangeably with "material containing cellulose" in the present application.

BACKGROUND ART

Wood, which is one type of material containing cellulose, has a high specific Young's modulus and a high specific strength, and processing thereof is very easy, so that it has been used as a material for dwellings, furniture, and the like, and furthermore, because it possesses superior acoustic characteristics, it has been used in soundboards of musical instruments.

Recently, the fact that wood possesses characteristics which are desirable with respect to the psychology, mental therapy, and health of human beings has been scientifically recognized, and the necessity of wooden material as a material for finishing the insides of dwellings has been recognized. Furthermore, wood is judged to have an elegance not present in concrete or metal, and has recently drawn attention as a structural member for large buildings.

However, while wood possesses these superior characteristics, depending on the environment and position of use, it is also susceptible to rotting, susceptible to dimensional variation, and the resistance to water and moisture thereof are inferior to those of other materials, and it is also susceptible to being eaten by termites and teredo and the like. In order to eliminate these types of defects associated with wood, it is necessary to improve the quality of the wood or to impart new characteristics to the wood, and the chemical modification of the wood is an extremely effective method therefor.

The chemical modification of materials containing cellulose such as wood is commonly conducted by replacing the hydroxyl groups present in the cell wall components of cells forming the material containing cellulose with other functional groups. One example of such chemical modification is the acetylation of materials containing cellulose.

Conventionally, methods such as those listed below were known as acetylation methods for materials containing cellulose.

(1) A method in which polyvalent metal halides are used as a catalyst and wooden material is acetylated by means of acetic anhydride (English Patent No. 579255). However, in this method, even under optimal conditions for the use of a mixture of acetic anhydride, acetic acid, and zinc chloride, processing is necessary for a long period, a period of 24 hours, at a temperature within a range of 38°–50° C.

(2) A method in which oven-desiccated thin wooden strips are treated using an acetylating medium containing acetic anhydride mixed with other components such as tertiary amines and acetone, and containing no moisture (U.S. Pat. No. 2,417,995). In this method, it is preferable to conduct the reaction in a vapor phase by means of a mixture of acetic anhydride and pyridine. However, in this acetylating method, the pyridine forms a complex which is difficult to recover, and when the reaction temperature is too high, the pyridine darkens the wooden strips, while when the reaction temperature is too low, the reaction period is relatively long, and moreover, it is necessary to use harmful or combustible chemicals.

(3) A method in which wooden material is acetylated without catalyst, and using a combination of acetic anhydride and xylene at a temperature of 105° C. and at an absolute pressure within a range of 150–170 psi (1.0–1.2 MPa) (U.S. Pat. No. 3,094,431). In this method, as a catalyst is not used, special treatment is necessary, and furthermore, the use of volatile, combustible organic solvents is unavoidable, so that the recovery of excess reaction products or byproducts is complicated.

(4) A method in which the acetylation of a hard board containing aluminum sulfate (functioning as a catalyst) is carried out in a vapor phase of acetic anhydride (TAPPI, Vol. 49, No. 1, 1966). However, in this method, it is not merely the case that the use of the aluminum sulfate is unavoidable, but it was also necessary to provide an extremely long exposure period (overnight heating).

(5) A treatment method is also known for lignocellulose materials in which, in order to improve upon the above methods, catalysts and solvents are not employed (Japanese Patent Application, First Publication, Laid-Open No. Sho 62-64501). In this method, the material is first immersed in advance in an acetic anhydride solution, then excess acetic anhydride is removed, and treatment was conducted for a period of 2 to 8 hours at a temperature of 120° C. It is thus possible to conduct acetylation in a shorter period of time than was possible with the acetylation methods described above. However, in this method, as a result of constraints for a guarantee of quality of the products, it is impossible to raise the treatment temperature to a level of 120° C. or more, so that there is a limit to the shortening of the treatment period. Furthermore, prior to acetylation, the material was immersed in acetic anhydride, and after this, excess acetic anhydride solution is removed, so that extra processes were necessitated.

As described above, the conventional acetylation methods for material containing cellulose have various problems, and it was thus either impossible to execute such methods on an industrial scale, or, even if it is possible to execute these methods on an industrial scale, there are problems in that manufacturing costs are high as a result of the long reaction time, the complexity of the processes, or the like.

Furthermore, in the conventional acetylation methods conducted in a liquid phase, even if post-processing such as washing with water or the like is conducted, there is a persistent acetic acid odor associated with the acetylated material containing cellulose, and metal materials which came into contact with the material containing cellulose, such as nails or the like, are likely to develop rust.

SUMMARY OF THE INVENTION

Accordingly, it is an object of the present invention to provide an acetylation method for material containing cellulose in which immersion processing in an acetic anhydride solution prior to the acetylation processing is not required.

It is a further object of the present invention to provide an acetylation method for material containing cellulose in which the reaction period is shortened in comparison with conventional methods.

It is a further object of the present invention to provide an acetylation method for material containing cellulose in which the uniformity of acetylation is improved in comparison with conventional methods.

It is a further object of the present invention to provide an acetylation method for material containing cellulose in which materials apart from the acetylating agent, such as catalysts, solvents, diluents, or the like, or auxiliary materials, need not be used, and in which the recovery of excess reaction products or byproducts after the acetylation processing is greatly simplified.

It is a further object of the present invention to provide an acetylation method for materials containing cellulose which does not require high pressure.

Furthermore, it is a further object of the present invention to provide an efficient manufacturing method for modified wood having superior moisture resistance, which employs the acetylation methods described above.

It is a further object of the present invention to provide a manufacturing method for modified wood having superior thermoplasticity.

It is a further object of the present invention to provide a manufacturing method for modified wood having no acetic acid odor.

It is a further object of the present invention to provide a manufacturing method for modified wood which suppresses the generation of rust on metallic materials such as nails or the like which are in contact with the wood.

The acetylation method for material containing cellulose in accordance with the present invention is characterized in that a vaporized acetylating agent is brought into contact with the material containing cellulose with a relative flow velocity therebetween so that the material containing cellulose is acetylated in a vapor phase.

In the acetylation method in accordance with the present invention, the acetylating agent in vapor phase possesses a relative speed with respect to the material containing cellulose, so that the acetylating agent does not preferentially remain in a single portion of the material containing cellulose, and the uniformity of the acetylating reaction is improved. Furthermore, in the acetylating method in accordance with the present invention, the acetylating agent is in motion, so that the heat of reaction generated by the acetylating reaction can be easily removed, and the control of the reaction temperature becomes a simple matter.

Furthermore, the manufacturing method for modified wood in accordance with the present invention is characterized in that a process in which, an acetylating agent in vapor phase is brought into contact with wooden strips possessing an increased surface area, while the acetylating agent is in constant motion, and thereby, a process in which the wooden strips are acetylated in a vapor phase, and a process in which these acetylated wooden strips are accumulated and molded so as to be integral, are contained.

In accordance with the manufacturing method for modified wood in accordance with the present invention, it is possible to uniformly acetylate wooden strips by means of a process requiring a short period of time, without the use of catalysts, solvents, or diluents, and these wooden strips are accumulated to form modified wood, so that manufacturing costs can be reduced. Furthermore, the modified wood obtained by means of the method of the present invention possesses superior resistance to moisture and thermal plasticity, and has no acetic acid odor, and does not promote the generation of rust.

DETAILED DESCRIPTION OF THE INVENTION

In the acetylating method for material containing cellulose in accordance with the present invention, first, material containing cellulose is supplied to a reaction vessel, and then an acetylating agent in vapor phase is supplied to this reaction vessel, and in a state in which this acetylating agent in vapor phase moves so as to have a relative speed with respect to the material containing cellulose, the acetylating agent in vapor phase comes into contact with the material containing cellulose, and the material containing cellulose is acetylated.

In the present invention, the method of providing a relative speed between the material containing cellulose and the acetylating agent in vapor phase is not particularly restricted. For example, (1) a method in which the material containing cellulose is essentially maintained in a fixed state in the reaction vessel, and the acetylating agent in vapor phase passes therethrough, (2) a method in which the acetylating agent in vapor phase is passed through the material containing cellulose while the material containing cellulose itself is agitated using agitation blades or the like in the reaction vessel, or (3) a method in which the material containing cellulose itself is agitated in the reaction vessel and is additionally caused to move, and the gaseous acetylating agent is passed therethrough, or the like, may be adopted.

Furthermore, the acetylation reaction of material containing cellulose is an exothermic reaction; for example, an acetylation reaction using acetic anhydride is given by the following formula.

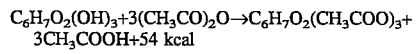

$$C_6H_7O_2(OH)_3 + 3(CH_3CO)_2O \rightarrow C_6H_7O_2(CH_3COO)_3 + 3CH_3COOH + 54 \text{ kcal}$$

Accordingly, in the acetylation reaction of a material containing cellulose, the heat of reaction accumulates as the reaction proceeds, and the temperature of the material containing cellulose which is to be acetylated rises, so that in the case in which the reaction temperature is inappropriately controlled, the material containing cellulose may be carbonized as a result of the accumulation of excessive heat of reaction, or there may be problems in that non-uniform acetylation is likely. According to the present invention, such carbonization is avoided because acetylating agent flows with relative speed to the material containing cellulose.

Figure 1:
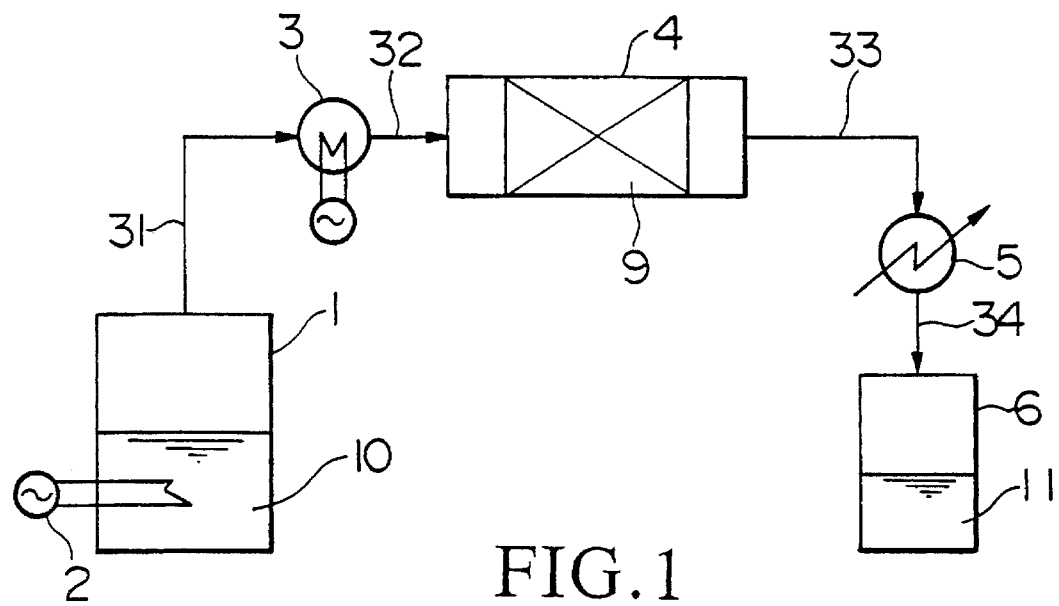
FIG. 1 is a drawing showing an example of a preferred apparatus for executing the acetylation method of the present invention.

An example of a reaction apparatus which is preferable for the execution of the acetylating method in accordance with the present invention is shown in the flowchart of FIG. 1. As shown in FIG. 1, a heater 2 is provided on an evaporator 1. Evaporator 1 is connected, where necessary, to a preheater 3 via piping 31, and furthermore, is connected in order to reaction vessel 4, condenser 5, and acceptor 6, via piping.

In the case in which this type of apparatus is used, in the acetylating method in accordance with the present invention, for example, the reaction vessel 4 is filled with a material 9 containing cellulose (for example, ligneous fibers) which is to be acetylated, an acetylating agent 10 (for example, acetic anhydride), with which evaporator 1 is filled, is heated in heater 2, vapor of acetylating agent is generated, and this is introduced to reaction vessel 4, and is passed through the material 9 containing cellulose with which reaction vessel 4 is filled. This acetylating agent vapor is preferably subjected to preheating in preheater 3 prior to supply thereof to reaction vessel 4, in order to promote an increase in temperature of the acetylating agent vapor, and to increase the speed of the acetylating reaction.

Although the boiling temperature of acetic anhydride is about 140° C. at atmospheric pressure, by passing through the preheater 3, the acetic anhydride vapor can be heated to above the boiling temperature. As a result, the reaction period can be shortened. Furthermore, if the vapor feed rate is controlled too high, the temperature difference between the inlet and the outlet of the reactor is minimized. Hence, the distribution of temperature in the materials can be uniform. In addition, because the acetic anhydride vapor continuously moves through the cellulosic material, the generated heat of reaction does not accumulate in the materials, thus carbonizing of the materials caused from localized overheat can be prevented. Accordingly, the processing can be accomplished in short period which leads to the production of high and uniform quality products.

The acetylating agent vapor which has been passed through the material 9 containing cellulose in this manner passes through piping 33, together with, for example, acetic acid vapor which is produced as a byproduct, and reaches condenser 5, is cooled and liquefied in condenser 5, and, after passing through piping 34, is stored in acceptor 6.

Material Containing Cellulose

In the present invention, no particular restriction is made with respect to the material containing cellulose, which is the material to be acetylated; however, material containing cellulose which has a comparatively large surface area is preferably employed. More concretely, fibers of woods such as, for example, flax, corn, bamboo, straw, or the like, and wood strips having increased surface areas, are preferably employed.

Here, what is meant by "wood strips having increased surface areas" is wooden strips having small dimensions and a comparatively large surface area, such as, for example, thin strips, small strips, or narrow strips of wood, or ligneous fibers. No particular restriction is made with respect to the method for obtaining such wooden strips having increased surface area; however, in the case of, for example, ligneous fibers, these are preferably obtained through defiberization of wood. More concretely, for example, wood is chipped with a chipper, and the chips obtained thereby are subjected to defiberization. In this defiberization, after the wooden chips are digested by means of high pressure vapor, defiberization is conducted by means of a disk refiner. The ligneous fibers thus obtained have narrow widths (the average width is preferably within a range of a few tens of μm to 1.5 mm), and the length thereof is large (the average length is preferably within a range of 1–40 mm), and the use of such fibers is preferable from the point of view of efficiently proceeding with the acetylation reaction.

It is preferable that such materials containing cellulose be desiccated so that the moisture content thereof is less than or equal to 3%, and more preferably less than or equal to 1%, prior to acetylation. This moisture content may be measured, for example, by a moisture content measuring device. This desiccation of the material containing cellulose is preferably accomplished, for example, by exposing the materials containing cellulose to hot air having a temperature within a range of approximately 80°–120° C. for a period within a range of 30–180 minutes. Furthermore, it is possible to shorten the desiccation time by conducting the desiccation under reduced pressure.

It is preferable that the filling density of the material containing cellulose which is preferably used in the present invention be within a range of approximately 20–300 kg/m$^3$.

Acetylating Agent

The present invention is characterized in conducting the acetylation reaction by bringing a material containing cellulose into contact with an acetylating agent in a vapor phase, while continuously moving the acetylating agent. Accordingly, it is sufficient if the acetylating agent used in the present invention is in a vapor phase at the reaction temperature of acetylation; at room temperature (25° C.), the acetylating agent may be in a vapor or a liquid. However, from the point of view of the ease of manipulation of the actual reaction, it is preferable that the acetylating agent is in a liquid state at room temperature. Concretely, examples of acetylating agents which are in vapor phase at room temperatures include ketene, and the like, and acetic acid derivatives such as acetic anhydride or the like are preferably employed as the acetylating agent which is in a liquid phase at room temperatures. Among these, when the balance between reactivity and corrosivity, or the ease of recovery and reuse of the reaction product, is taken into account, the use of acetic anhydride is particularly preferable.

The acetic anhydride which is employed in the present invention may contain a certain amount of impurities (for example, acetic acid); however, when the efficiency of the acetylation reaction is taken into consideration, it is preferable that the purity of the acetic anhydride which is employed be 60 weight percent or more, a purity of 80 weight percent is further preferable, and a purity of 90 weight percent is still further preferable.

Diluent

In the acetylating method in accordance with the present invention, it is a simple matter to prevent the accumulation of the heat of reaction, so that the acetylating agent may be used without dilution. However, in the present invention, where necessary, the acetylating agent may be diluted with an inert solvent (for example, xylene) with which the acetylating agent does not react, and used in this diluted form. It is preferable that the amount of diluent used in this case be less than or equal to 80 parts per weight with respect to 100 parts per weight of the acetylating agent, and a level of less than or equal to 70 parts per weight is further preferable.

In the case in which the acetylating agent is used in a form in which it is diluted with a diluent, it is possible to proceed with the exothermic acetylating reaction under milder conditions, and it is thus a simple matter to suppress excessive acetylation of the material containing cellulose or the degradation of this material as a result of heat. However, the use of a diluent increases the likelihood of a reduction in speed of the acetylation reaction, and there is a tendency for the recovery and reuse of the acetylating agent to become complicated. Accordingly, the use of the diluent should be conducted in consideration of these balances.

Preprocessing

In the method of acetylating in vapor phase in accordance with the present invention, it is a simple matter to obtain a high degree of acetylation in a comparatively short period of time, so that preprocessing of the material containing cellulose is normally not required. However, where necessary, preprocessing with a catalyst is possible prior to acetylation in vapor phase. This preprocessing is preferably conducted by means of a method in which the material containing cellulose is immersed for a period within a range of from 10 minutes to 2 hours in a 1–10% aqueous solution of acetates such as sodium acetate, potassium acetate, or the like, or by means of a method in which the material containing cellulose is impregnated with the aqueous solution described above under reduced pressure. The material containing cellulose which has been subjected to preprocessing in this manner is acetylated, where necessary, after being desiccated.

By means of this type of preprocessing using a catalyst, the acetylation reaction in the vapor phase is promoted, and a shortening of the reaction period and an increase in the degree of acetylation is easily achieved; however, there is a tendency for the processes to become complicated. Accordingly, it is preferable that such preprocessing be conducted in consideration of the balance of the above factors.

When resin components (such as extract components) are retained in the materials, it is sometimes observed that the materials are discolored to brown, after the acetylation process. In order to prevent this discoloration, the materials may be washed, in advance, by hot water or organic solvent. Furthermore, the materials may be bleached by means of sodium. hypochlorite.

Reaction Conditions

In the acetylation reaction in accordance with the present invention, in, for example, the case in which acetic anhydride is used as the acetylating agent, it is preferable that the reaction temperature be within a range of 140°–250° C. and a range of 170°–180° C. is further preferable at atmospheric pressure.

The reaction period is normally within a range of approximately 15 minutes to 4 hours, and a range of from 15 minutes to 30 minutes is further preferable; however, this period may be appropriately set in accordance with the reaction temperature, the desired degree of acetylation, or the like.

The reaction pressure is not particularly restricted, and may be appropriately determined in accordance with the economic considerations of the facilities; however, this pressure is normally sufficient at a range of from normal pressure to approximately 2 kgf/cm$^2$G.

The movement speed (empty column speed) of vapor of acetylating agent within the material containing cellulose is not particularly restricted; however, a speed within a range of 0.1–1.0 m/sec is preferable, and a speed within a range of 0.2–0.5 m/sec is further preferable.

The degree of acetylation of the material containing cellulose by means of acetylation such as that described above is normally preferably within a range of approximately 10 to 30% weight per gain (WPG), this percentage referring to the weight increase ratio (that is to say, the ratio of the amount of increase in weight of the material containing cellulose as a result of acetylation, with respect to the weight of the material containing cellulose prior to acetylation); however, this may be appropriately modified in accordance with the required moisture resistance.

Post-Processing

The material containing cellulose which has been subjected to an acetylation reaction in a vapor phase such as that described above is normally washed with water or with heated water, and after the excess acetylating agent adhering to the material containing cellulose has been removed, it is preferable that the material containing cellulose be desiccated to a predetermined moisture content.

As a post-processing, hot air of 80°–160° C. may be blown for 20–120 minutes, in order to remove the agents and decicate.

In the vapor phase acetylation in accordance with the present invention, the speed of the reaction is greatly increased in comparison with that of the conventional method, so that it is possible to greatly shorten the period of time necessary for the reaction. Accordingly, it is possible to process materials on an industrial scale by means of an apparatus smaller than conventional industrial apparatus. In this type of industrial scale processing, the removal of the heat of reaction accompanying the progress of the reaction, and the control of the reaction temperature, are important. An example of a reaction apparatus which is particularly appropriate for use in consideration of such points is shown in the flowsheet of FIG. 2.

Figure 2:
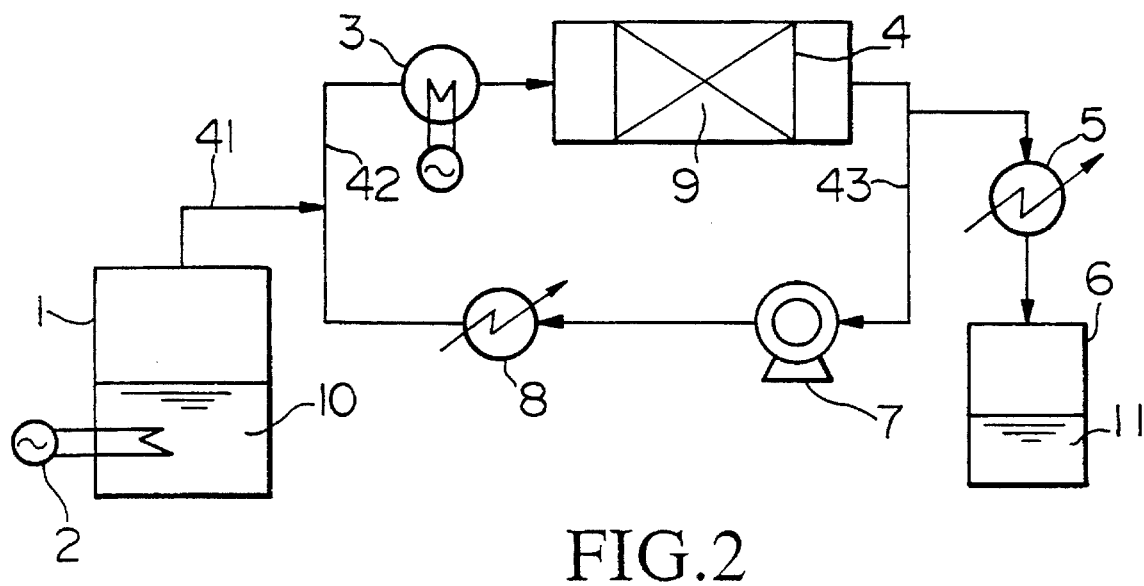
FIG. 2 shows an example of a preferred apparatus for executing, on an industrial scale, the acetylation method of the present invention.

In the reaction apparatus of FIG. 2, the gas discharged from reaction vessel 4 into piping 43 is returned again to the reaction vessel 4 through circulation blower 7, and the acetylating agent is circulated, and thereby, it is possible to reduce the amount of acetylating agent, then reduce processing costs. Furthermore, in order to reduce the temperature of the acetylating agent, which was raised as a result of the heat of reaction generated in the reaction vessel 4, and in order to control this at an appropriate temperature, a cooler 8 is disposed on the circulation line. By using an apparatus of this type, it is possible to produce the acetylated material containing cellulose at low cost and in large amount by compact reacter.

In the apparatus of this type, circulation blower 7 is adopted so that the reacted acetic anhydride vapor can be fed back via cooler 8. As a result, the temperature can be controlled easier.

In addition, the cooler 8 may be removed from this apparatus depending on a heat loss of the circulation system. Furthermore, if a pre-heater is equipped on pipings 41, temperature can be controlled further easily.

Next, the manufacturing method for modified wood in accordance with the present invention will be explained.

In the manufacturing method for modified wood in accordance with the present invention, acetylated cellulosic material, in particular, acetylated wooden strips, which has been subjected to the acetylating processing described above, is accumulated, solidified, and molded to form modified wood having freely selected shapes such as board shapes, column shapes, and the like.

This accumulation and solidification may be accomplished by means of a conventional method in which a binder comprising a synthetic resin adhesive is applied to the surfaces of acetylated wooden strips, these wooden strips are placed in a pre-specified mold after the application of the binder, heat and pressure is applied to accomplish curing, and the wooden strips are made integral.

The modified wood comprising integrally molded acetylated wooden strips formed in this way are characterized in that they possess little directionality, are uniform, the working thereof is easy, and the shape thereof is not limited to flat surfaces, but curved surfaces may also be molded, and in that large scale production thereof is possible. Wood boards in which unacetylated ligneous fibers are simply molded integrally have a porous form resulting from the gaps between fibers, and the effective surface area thereof is large, so that such boards possess defects in that the moisture content thereof is high and the resistance to moisture thereof is poor; however, such defects are eliminated as a result of the acetylation described above. Furthermore, by means of this type of acetylation, the creep characteristics (the deformation under a fixed load) of the wooden material are improved.

In the acetylation method for material containing cellulose and the manufacturing method for modified wood in accordance with the present invention, the acetylation of the material containing cellulose is conducted in the vapor phase, so that in comparison with conventional liquid phase acetylation methods, the amount of acetylating agent used can be reduced.

Furthermore, the acetylation of the material containing cellulose in accordance with the present invention is a reaction which takes place in the vapor phase, so that less acetylating agent remains within the material containing cellulose after the reaction than is the case in the conventional method. Accordingly, in accordance with the present invention, the elimination of the acetylating agent by means of washing with water or the like is easy, and no acetic acid odor is associated with the acetylated material containing cellulose or the modified wood manufactured in this manner.

In accordance with the acetylating method or the manufacturing method for modified wood in accordance with the present invention, the following superior effects were obtained.

(1) An immersion processing in an acetylating agent (liquid) is not necessary, so that the process is simplified.

(2) The acetylating agent in vapor phase is brought into contact with the material containing cellulose while in motion, so that the efficiency of the reaction is improved, and the acetylation reaction period can be shortened.

(3) The acetylating agent in vapor phase is brought into contact with the material containing cellulose while in motion, so that the accumulation of excess heat of reaction in the material containing cellulose during the reaction is prevented, and the uniformity of acetylation is improved.

(4) As a result of the improvement in reaction efficiency and the prevention of the accumulation of the heat of reaction described above, the use of materials other than the acetylating agent, such as catalysts, solvents, diluents, and the like, or auxiliary materials, is not required, so that the recovery of excess reaction products or byproducts after the acetylation processing is greatly simplified.

(5) The acetylating agent in vapor phase is brought into contact with the material containing cellulose while in motion, so that it is possible to obtain a satisfactory reaction efficiency without the use of high pressure.

(6) Wooden strips possessing a high degree of acetylation with improved uniformity can be easily obtained, so that by integrally molding these acetylated wooden strips, a modified wood can be efficiently produced which has superior thermoplasticity (is easily made integral), resistance to water, and resistance to moisture, has good creep characteristics and dimensional stability, is not susceptible to rotting, and is resistant to being consumed by termites, teredos, and the like.

(7) As a result of conducting vapor phase acetylation, the amount of acetylating agent used is greatly reduced in comparison with the conventional methods conducted in a liquid phase, so that after post-processing such as washing with water or the like, it is unlikely that acetic acid will remain in the acetylated cellulose material. Accordingly, there is no acetic acid odor, and the generation of rust on metallic materials (nails or the like) which come into contact with the material containing cellulose is prevented. Furthermore, by means of the efficient use of the acetylating agent, it is possible to keep production costs low.

Hereinbelow, using illustrating examples, the present invention will be described in greater detail.

EXAMPLES

Example 1 (at atmospheric pressure)

Wood (red cedar from North America) was digested and decomposed, and approximately 15 g of completely desiccated (moisture content 1%) long and narrow wooden fibers obtained thereby (average fiber length: 20 mm) were prepared.

In this embodiment, using a reaction apparatus such as that shown in FIG. 1, approximately 15 g of material 9 containing cellulose (the wooden fibers) described above were packed within a glass reaction vessel 4 having an inner diameter of 50 mm and a length of 300 mm. 2.5 l of the acetylating agent 10, that is to say acetic anhydride was placed in evaporator 1, this was heated by heater 2 and the acetic anhydride was vaporized, this was preheated to a temperature of 142° C. in pre-heater 3, this acetic anhydride vapor was passed through the wooden fibers 9 filling the reaction vessel 4 described above, and the acetylation of the wooden fibers was conducted. The conditions of the acetylation processing were such that the reaction temperature was 140° C., and the reaction period was 0.5 hours.

The wooden fibers subjected to the acetylation processing described above were washed with water and desiccated to a moisture content of 1%, and the weight increase ratio (degree of acetylation) was measured.

Furthermore, in order to evaluate the uniformity of the acetylation, wooden fibers disposed near the walls of reaction vessel 4, and wooden fibers disposed at the center (the inner side) of the reaction vessel 4, were separately recovered, and these were subjected to water washing and desiccation in a manner identical to that described above, the infrared absorption spectrum thereof was measured by FT-IR (the ATR method), and the absorbance at 1230 $cm^1$ and 1740 $cm^1$ ($CH_3COOR$ absorption) were compared.

Example 2 (at atmospheric pressure)

In this example, the acetic anhydride vapor introduced into reaction vessel 4 was preheated to a temperature of approximately 180° C. by pre-heater 3, and the acetylation processing temperature was set to 180° C.; aside from this, acetylation of wooden fibers was conducted in a manner identical to that of Example 1.

In the case in which the temperature is raised in this way, there may be a danger of the carbonization or the like of the wooden fibers when a method was adopted in which the acetylating agent vapor did not move within a relative speed with respect to the wooden fibers. However, in the present example, the acetic anhydride vapor was caused to flow at a speed of 0.2 m/sec (empty column speed), and thereby, it was possible to make the temperature of the wooden fiber uniform and to prevent the carbonization of the wooden fibers.

The wooden fibers which were subjected to acetylation processing in the manner described above were washed with water and desiccated in a manner identical to that of Example 1, and the weight per gain thereof was measured. Furthermore, the uniformity of acetylation of the wooden fibers was evaluated using a method identical to that of Example 1.

Example 3

Wooden fibers were prepared as the same manner to Example 1. The wooden fibers were acetylated by both the acetylation method of the present invention and the conventional method. Acetic anhydride was used as the acetylation agent, and the period for acetylation by WPG reaches to 20% was measured. The results obtained is shown in Table 3.

From these results, the acetylation speed of the present invention is faster by three times than that of the conventional method. Accordingly, by using the method of the present invention, period off acetylating reaction can be shortened and the production efficiency can be improved.

Comparative Example 1

Figure 3:
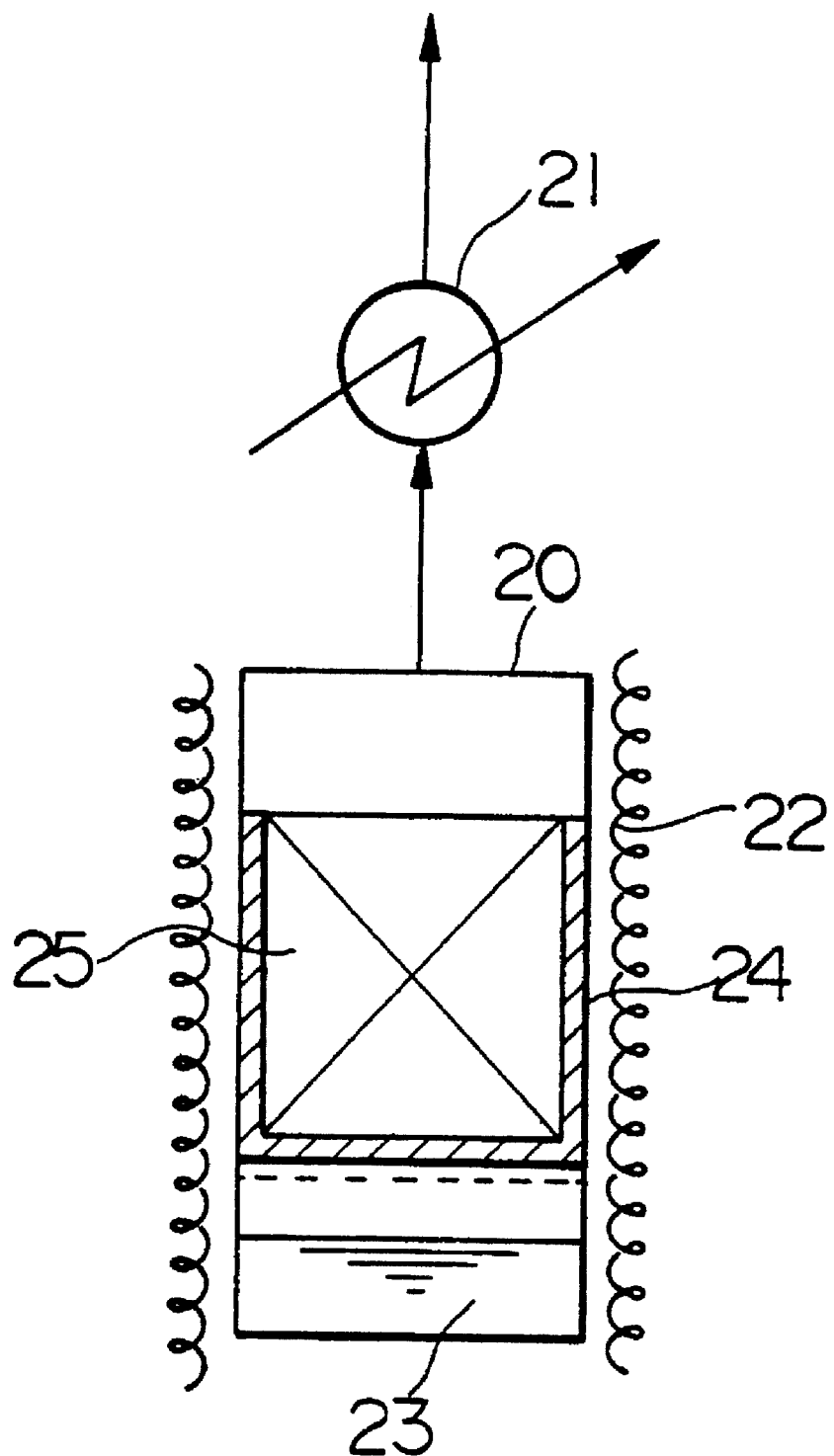
FIG. 3 shows the outlines of the structure of an apparatus used in Comparative Example 1.

In this Comparative Example, the reaction apparatus shown in the flowsheet of FIG. 3 was employed. With reference to FIG. 3, in this reaction apparatus, a condenser 21 is connected to the upper portion of a 3 liter reaction vessel 20, and a heater 22 is disposed about the circumference of the reaction vessel 20.

In this Comparative Example, approximately 100 ml of the acetic anhydride 23 was placed in the reaction vessel 20, a stainless steel net 24 (size: approximately 15 cm$\phi$×a depth of 15 cm) into which wooden fibers 25 (approximately 100 g) identical to those used in Embodiment 1 described above were packed, was disposed above the acetic anhydride 23 in such a manner as not to come into direct contact with the acetic anhydride (liquid). The entirety of the reaction vessel 20 was heated to a temperature of 140° C. using heater 22, and by vaporizing the acetic anhydride 23, the wooden fibers 25 were acetylated.

In this acetylation, processing was conducted while varying the reaction period, from the point at which the temperature of the wooden fibers reached 120° C., among 0.25, 0.5, 0.75, and 1.0 hours.

In this Comparative Example, the acetic anhydride vapor was subject solely to convection as a result of heating within reaction vessel 20, so that the outer side of the wooden fiber lump 25 was cooled by the acetic anhydride vapor (140° C.). On the contrary, the inner portion of the fiber lump 25 reached to a temperature within a range of 180°–200° C. as a result of the accumulation of the heat of reaction, and carbonization of the fibers in the inner portion of the fiber lump 25 occurred.

Wooden fibers which were subjected to acetylation processing as described above were washed with water and desiccated in a manner identical to that of Example 1, and the weight increase ratio thereof was measured. Furthermore, the uniformity of acetylation of the wooden fibers was evaluated using FT-IR in a manner identical to that of Example 1.

The results obtained in the Examples and Comparative Examples described above are shown in Tables 1 and 2 below.

TABLE 1

WEIGHT INCREASE RATIO (%) OF THE WOODEN FIBERS RESULTING FROM ACETYLATION

| | REACTION PERIOD (HOURS) | | | |
| --- | --- | --- | --- | --- |
| | 0.25 | 0.5 | 0.75 | 1.0 |
| EXAMPLE 1 | 10.2 | 15.6 | — | — |
| EXAMPLE 2 | 16.1 | 21.4 | — | — |
| COMPARATIVE EXAMPLE 1 | 10.8 | 17.4 | 21.0 | 24.2 |

TABLE 2

| | ABSORBANCE AT 1740 cm$^{-1}$ | | WEIGHT PER GAIN (%) OF THE FIBERS AS A WHOLE |
| --- | --- | --- | --- |
| | INTERIOR SIDE | NEAR VESSEL WALL | |
| EXAMPLE 1 (PROCESSING FOR 0.5 HOUR) | 0.008 | 0.008 | 15.6 |
| EXAMPLE 2 (PROCESSING FOR 0.5 HOUR) | 0.013 | 0.013 | 21.4 |
| COMPARATIVE EXAMPLE 1 (PROCESSING FOR 0.25 HOUR) | 0.11 | 0.006 | 10.8 |

TABLE 3

| | acetylating temperature | acetylating period |
| --- | --- | --- |
| Example 3 (METHOD OF PRESENT INVENTION) | 180° C. | 10 minutes |
| Conventional Method | 140° C. | 30 minutes |

Although the invention has been described and illustrated with reference to specific embodiments thereof, it is not intended that the invention be limited to these illustrative embodiments. Those skilled in the art will recognize that modifications and variations can be made without departing from the spirit of the invention. It is intended that this invention encompass variations and modifications which fall within the scope of the appended claims.

What is claimed is:

1. A method of acetylating cellulosic material, comprising the steps of:

(a) providing an acetylating agent in a liquid phase;

(b) providing a lump of cellulosic material in a container having an inlet and an outlet;

(c) raising the temperature of the acetylating agent in the liquid phase to convert the acetylating agent into a vapor phase;

(d) introducing the acetylating agent in the vapor phase to the container through the inlet and flowing, the acetylating agent in the vapor phase through the lump of the cellulosic material, the acetylating agent in the vapor phase being outputted from the outlet; and (e) collecting the acetylating agent in the vapor phase outputted from the outlet; and (f) feeding back a part of the collected acetylating agent in the vapor phase to the inlet of the container through a circulation blower with at least a portion of said collected acetylating agent not being condensed prior to feeding the collected acetylating agent back to the inlet of the container.

2. A method according to claim 1, wherein step (d) comprises the steps of:

(c-1) introducing the acetylating agent in vapor phase to the container through piping.

3. A method according to claim 2, wherein step (c-1) further comprises the steps of:

(c-2) raising the temperature of the acetylating agent in vapor phase in the piping.

4. A method according to claim 3, wherein the temperature is raised by a heater.

5. A method according to claim 4, wherein the temperature is raised to a temperature of from 140° to 250° C.

6. A method according to claim 5, wherein the temperature is raised to a temperature of from 140° to 250° C.

7. A method according to claim 1, wherein the cellulosic material is selected from the group consisting of wooden strips, wood veneer, ligneous fiber and plant fiber.

8. A method according to claim 7, wherein the plant fiber is selected from the group consisting of flax, corn, bamboo, and straw fiber.

9. A method according to claim 1, wherein the acetylating agent is selected from the group consisting of acetic anhydride, and ketene.

10. A method according to claim 1, wherein step (e) further comprises the steps of:

(e-1) liquefying the collected acetylating agent.

11. A method according to claim 1, further comprising the steps of:

(g) heating the collected acetylating agent before feeding it back to the inlet of the container.

12. A method according to claim 1, wherein the acetylating agent in the liquid phase is diluted by a diluent.

13. A method according to claim 12, wherein the diluent is xylene.

* * * * *